Patented Nov. 19, 1940

2,221,808

UNITED STATES PATENT OFFICE 2,221,808

HALO-SUBSTITUTED POLYALKYL PHENOLS

Lindley E. Mills and Cecil M. Galloway, Midland, Mich., assignors to The Dow Chemical Company, Midland, Mich., a corporation of Michigan No Drawing. Application July 15, 1935,
Serial No. 31,456

16 Claims. (Cl. 260—623)

The present invention regards a new class of compounds, namely, the halogen substituted polyalkyl phenols having a total of 5 or more carbon atoms in the substituting alkyl groups.

We have prepared compounds of the aforementioned class, determined certain physical properties thereof whereby they may be readily identified, and have found that they may advantageously be used for various purposes, for example, as antiseptics, germicides, etc. The invention, then, consists of the new products hereinafter fully described and particularly pointed out in the claims.

The compounds included within the scope of our invention have the following general structural formula, wherein one X represents a halogen, e. g., chlorine or bromine, another X represents an alkyl group, and the third X also represents an alkyl group, the sum of the carbon atoms in the two alkyl groups being at least 5:

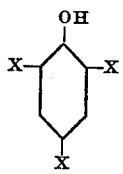

The preparation of our new compounds can be accomplished by treating a polyalkyl substituted phenol directly with a halogen. For example, such a phenol is placed in a closed reactor, preferably provided with an agitator, a halogen inlet, and an outlet suitable for the removal of the hydrogen halide gas formed during the course of the reaction. The phenol is heated above the melting point, if the material is normally a solid, and the halogen then introduced below the surface of the molten phenol. A solvent for the phenol, which is not halogenated under the conditions of the reaction, may be used if desired. Among the solvents we have found suitable for use are carbon tetrachloride and ethylene chloride. After the desired amount of halogen has been introduced into the reactor, the reaction product is then blown with air for removal of any small amounts of hydrogen halide remaining therein. The product, i. e., hydroxy-monohalopolyalkyl-benzene, can then be separated from the reaction product by fractional distillation, preferably in vacuo.

In the direct halogenation of polyalkyl phenols, halogenating agents other than elemental chlorine and bromine may also be used, viz., antimony pentachloride, aluminum bromide, etc.

Among other ways in which our new class of compounds may be prepared are (1) by the condensation of a halogenated monoalkyl phenol with an alkyl halide in the presence of a catalyst such as $ZnCl_2$, $Al_2Cl_6$, etc.; (2) by partial hydrolysis of a di-halogenated di-alkyl substituted benzene in the presence of a suitable catalyst, e. g., copper, cuprous oxide, etc.; (3) by condensation of a mono-halo-phenol with an alkyl halide.

The following examples describe in detail the preparation of certain specific members of our new class of compounds, but are not to be construed as limiting the invention.

EXAMPLE 1. — 2-chloro-4-tertiarybutyl-6-methylphenol

In a reactor provided with an agitator was placed 50 grams (0.305 mol) of 4-tertiarybutyl-6-methyl-phenol. The phenol was heated to and maintained at a temperature of about 65°–80° C., and chlorine was introduced slowly, with stirring, below the surface of the liquid compound. When 0.348 mol of hydrogen chloride had been evolved from the reaction mixture, the passage of chlorine thereinto was stopped and the product was blown with air to remove a small amount of hydrogen chloride remaining therein. The product was then fractionated in vacuo to obtain a liquid boiling at 96° to 97° C. at 6 millimeters of mercury absolute pressure. The compound was analyzed, and the percentage of chlorine contained therein was found to correspond closely to theoretical, i. e., 17.92%. The product, 2-chloro-4-tertiarybutyl-6-methyl-phenol, is a very viscous colorless liquid, easily soluble in sodium hydroxide and in practically all organic solvents. When dissolved in dilute aqueous sodium hydroxide, the phenol coefficient against E. typhi was found to be 11.1.

EXAMPLE 2. — 2-bromo-4-tertiarybutyl-6-methylphenol

In the same apparatus as used in the above experiment was placed 50 grams (0.305 mol) of 4-tertiarybutyl-6-methyl-phenol. The temperature was held at approximately 30° C. and 48.8 grams (0.305 mol) of liquid bromine was introduced slowly, with stirring, below the surface of the phenol. After all the bromine had been introduced, the reaction product was blown with air to remove a small amount of hydrogen bromide remaining therein, and was then fractionated in vacuo to obtain a liquid boiling at 96° C. at 3 millimeters of mercury absolute pressure. The compound was analyzed and the percentage of bromine contained therein was found to be 32.45 per cent, which corresponds closely to the theoretical of 32.92 per cent. The product, 2-bromo-4-tertiarybutyl-6-methyl-phenol, is a rather viscous, colorless liquid, easily soluble in sodium hydroxide and in practically all organic solvents. When dissolved in dilute aqueous sodium hydroxide, the phenol coefficient against *E. typhi* was found to be 2.8.

EXAMPLE 3. — *2-chloro-4-tertiaryamyl-6-methyl-phenol*

In the same apparatus as described in Example 1 was placed 50 grams (0.28 mol) of 4-tertiary-amyl-6-methyl-phenol. The phenol was heated to and maintained at a temperature of about 70° to 75° C., and chlorine was bubbled slowly into the liquid compound. When 0.31 mol of hydrogen chloride had been evolved from the reaction mixture, the passage of chlorine thereinto was stopped and the product was blown with air to remove dissolved hydrogen chloride. The product was then fractionated in vacuo to obtain a crystalline solid boiling at 120° to 121° C. at 8 millimeters of mercury absolute pressure. Analysis for chlorine showed an actual percentage thereof of 16.77, corresponding almost exactly to the theoretical percentage of 16.7. We thus obtained 2-chloro-4-tertiaryamyl-6-methyl-phenol, which is a white crystalline solid, having a melting point of 32° C., and is soluble in dilute sodium hydroxide and ordinary organic solvents. Its phenol coefficient *E. typhi* is 5.5 when dissolved in dilute sodium hydroxide.

EXAMPLE 4.—*2-bromo-4-tertiaryamyl-6-methyl-phenol*

We employed 50 grams (0.28 mol) of 4-tertiary-amyl-6-methyl-phenol, maintained at a temperature of about 30°–35° C., and added slowly thereto 44.8 grams (0.28 mol) of liquid bromine. The yield of product obtained by fractional distillation from the reaction product was 45.5 grams, corresponding to a 65 per cent of theoretical yield. The boiling point of the compound is 106° C. at 2.5 millimeters of mercury absolute pressure. Analysis for bromine showed an actual percentage thereof of 30.45 per cent, corresponding approximately to theoretical. 2-bromo-4-tertiaryamyl-6-methyl-phenol is a water-white, viscous liquid, having a phenol coefficient of 5.5 against *E. typhi* when dissolved in dilute sodium hydroxide.

EXAMPLE 5.—*2-bromo-4,6-di-tertiarybutyl-phenol*

150 grams (0.728 mol) of 4,6-di-tertiarybutyl-phenol was placed in the same apparatus as previously described, maintained at a temperature of about 55° C., and 116.5 grams (0.728 mol) of liquid bromine was introduced slowly below the surface of the heated phenol. After all of the bromine had been introduced, the reaction product was blown with air and then fractionally distilled in vacuo. In this manner 170 grams of 2-bromo-4,6-di-tertiarybutyl-phenol was obtained, corresponding to an 82 per cent of theoretical yield. The compound was analyzed, and the percentage of bromine contained therein was found to be 27.97 per cent, as compared to a theoretical of 28.07 per cent. This product, 2-bromo-4,6-di-tertiarybutyl-phenol, is a white, crystalline compound, boiling at 141° to 142° C. under 7 millimeters of mercury pressure absolute, and having a melting point of 55.5° C. It is difficultly soluble in caustic alkali but soluble in most organic solvents.

EXAMPLE 6.—*2-chloro-4,6-di-tertiarybutyl-phenol*

150 grams (0.728 mol) of 4,6-di-tertiarybutyl-phenol was directly chlorinated at 70° to 80° C., in the manner previously described, until the theoretical amount of hydrogen chloride for the monochloro compound was evolved. The product was blown with air to remove any dissolved hydrogen chloride, and fractionated in vacuo. 167 grams of 2-chloro-4,6-di-tertiarybutyl-phenol was obtained, corresponding to a 94.3 per cent of theoretical yield. This product, 2-chloro-4,6-di-tertiarybutyl-phenol, was analyzed and found to contain 15.85 per cent of chlorine, corresponding approximately to theoretical. This compound is a colorless, viscous liquid, boiling at 123°–124° C. at 8 millimeters of mercury pressure absolute. It is difficultly soluble in caustic alkali but is soluble in most organic solvents.

The phenol coefficients of our new compounds were determined by the method developed by the United States Public Health Service, Hygienic Laboratory, Circular No. 198 of the Food and Drug Administration, United States Department of Agriculture, and are based upon a coefficient of 1.0 for pure phenol.

We have found that other compounds within the scope of this invention can be prepared wherein the substituting alkyl groups and the halogen are in different relative positions, e. g., 2-methyl-4-chloro-6-tertiarybutyl-phenol, 2-bromo-4-methyl-6-tertiaryamyl-phenol, etc. We have also found that other polyalkyl phenols than those described in the specific examples can be halogenated directly to obtain compounds falling within our new class of halo-substituted polyalkyl phenols. Phenols substituted with normal and secondary alkyl groupings also yield halogenated products of the class here involved, i. e., 2-bromo-4-normalhexyl-6-methyl-phenol, 2-ethyl-4-chloro-6-normalbutyl-phenol, 2-chloro-4,6-diisopropyl-phenol, 2-bromo-4-octyl-6-methyl-phenol, etc.

Other modes of applying the principle of our invention may be employed instead of the one explained, change being made as regards the materials employed, provided the products claimed in the folowing claims be thereby obtained.

We therefore particularly point out and distinctly claim as our invention:

1. A compound having the following structural formula:

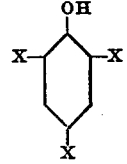

wherein one X represents a halogen, another X represents an alkyl group, and the third X represents a tertiary alkyl group.

2. A compound having the following structural formula:

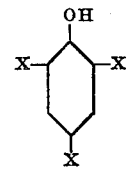

wherein one X represents a halogen, another X represents a methyl group, and the third X represents a tertiary alkyl group.

3. A compound having the following structural formula:

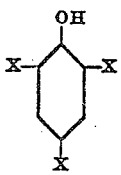

wherein one X represents a halogen, another X represents a tertiary alkyl group, and the third X also represents a tertiary alkyl group.

4. A compound having the following structural formula:

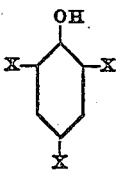

wherein one X represents chlorine, another X represents a tertiary alkyl group, and the third X represents an alkyl group, the sum of the carbon atoms in the substituting alkyl groups being at least 5.

5. A compound having the following structural formula:

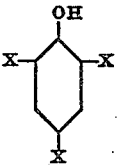

wherein one X represents bromine, another X represents an alkyl group, and the third X also represents an alkyl group, the sum of the carbon atoms in the substituting alkyl groups being at least 5.

6. A compound having the following structural formula:

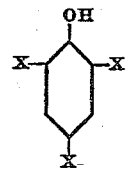

wherein one X represents a halogen, another X represents an alkyl group, and the third X represents a tertiary butyl group.

7. A compound having the following structural formula:

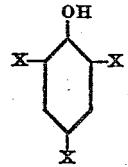

wherein one X represents a halogen, another X represents an alkyl group, and the third X represents a tertiary amyl group.

8. Bromo-tertiarybutyl-methyl-phenol.
9. Bromo-tertiaryamyl-methyl-phenol.
10. Chloro-tertiaryamyl-methyl-phenol.
11. 2-bromo-4-tertiarybutyl-6-methyl-phenol.
12. 2-bromo-4-tertiaryamyl-6-methyl-phenol.
13. 2-chloro-4-tertiaryamyl-6-methyl-phenol.
14. A hydrocarbon substituted mono-bromophenol having at least one substituting alkyl radical, the number of carbon atoms in the substituting hydrocarbon radical or radicals being at least 5.
15. A polyalkyl substituted mono-bromophenol, the sum of the carbon atoms in the substituting alkyl radicals being at least 5.
16. An alkyl-substituted halo-phenol having at least 1 substituting tertiary alkyl radical, the number of carbon atoms in the substituting alkyl radical or radicals being at least 5.

LINDLEY E. MILLS.
CECIL M. GALLOWAY.